United States Patent [19]

Tanaka et al.

[11] 4,302,837
[45] Nov. 24, 1981

[54] FM MULTIPLEX SYSTEM FOR SELECTIVELY DELAYING ONE OF TWO AUDIO SIGNALS

[75] Inventors: Shigeo Tanaka, Ichikawa; Keitaro Yamashita, Tokyo, both of Japan

[73] Assignee: Sony Corporation, Tokyo, Japan

[21] Appl. No.: 96,444

[22] Filed: Nov. 21, 1979

[30] Foreign Application Priority Data

Nov. 29, 1978 [JP] Japan .......................... 53-164741[U]

[51] Int. Cl.³ ............................ H04H 5/00; H04J 1/00
[52] U.S. Cl. .................................... 370/69; 358/144; 179/1 GB
[58] Field of Search .......... 370/69; 179/1 GB, 1 GC, 179/1 GD, 1 GM, 1 G, 1 J, 1 AT; 358/143, 144

[56] References Cited

U.S. PATENT DOCUMENTS 3,919,480  11/1975  Fukami ......................... 179/1 GQ
3,970,787   7/1976  Searle ........................... 179/1 AT
4,048,654   9/1977  Wegner .......................... 358/144

FOREIGN PATENT DOCUMENTS 2297533  8/1976  France ............................... 358/143

OTHER PUBLICATIONS

NHK Laboratories Note, "Simultaneous Transmission of Two Television Sound Channels", by Nomaguchi et al, Feb. 1970 Serial No. 132.
"Simultaneous Transmission of Two Languages on Television" by Mohanty, J. Instn. Telecom. Engrs. vol. 18, No. 7, 1972, pp. 313-319.

Primary Examiner—Douglas W. Olms
Attorney, Agent, or Firm—Hill, Van Santen, Steadman, Chiara & Simpson

[57] ABSTRACT

An FM multiplex audio system wherein either stereo signals or signals of two languages can be simultaneously transmitted and where switch means are provided so as to selectively delay either of the language signals so that the listener will hear a first language and then after a delay a second language. Means are also provided for muting either of the language signals if desired.

7 Claims, 1 Drawing Figure

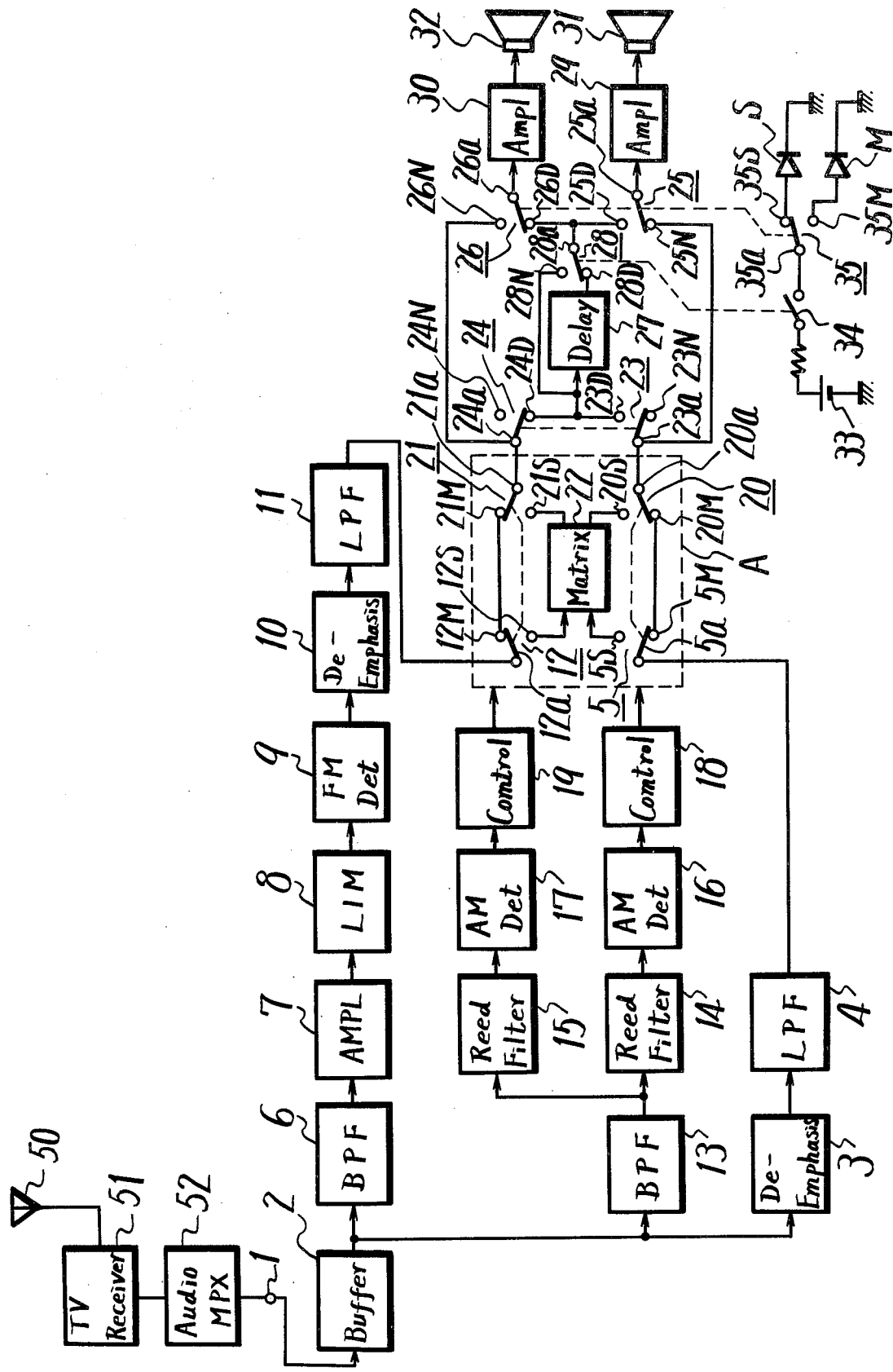

FM MULTIPLEX SYSTEM FOR SELECTIVELY DELAYING ONE OF TWO AUDIO SIGNALS

BACKGROUND OF THE INVENTION

1. Field of the Invention

This invention relates in general to multiplex stereo systems and particular to a novel system for use with the simultaneous translation of intelligence in two different languages.

2. Description of the Prior Art

Prior art systems exist wherein multiplex sound broadcast which either transmits stereo broadcasting signals or alternatively, bilingual broadcasting signals are known. Such signals are transmitted by television transmitters and received by television receivers which separate out the multiplex audio signal and are also transmitted by broadcast radio signals which transmit the audio which is received by multiplex receivers so as to separate two separate and distinct channels.

With existing multiplex television sound broadcast signals which broadcast bilingual signals such as multiplex TV sound broadcast, the viewer can, for example, study English by listening, for example, to both the English and the Japanese words. However, since the English and Japanese words are simultaneously reproduced by the two separate channels, it is very difficult to understand the content of the programs and distinguish between the Japanese and English words.

SUMMARY OF THE INVENTION

The present invention provides a multiplex sound demodulating apparatus for either television or radio in which one of the two voice signals can be selectively delayed so that one of the two languages will first be heard and then the other language will be heard so that a viewer or a listener can study the language and understand the content of the programs. Furthermore, means are provided wherein the order of the two languages can be reversed such that, for example, first the Japanese word is heard and then the English word at a later time or, alternatively, first the English word and subsequently the Japanese word as well as providing that either of the two languages can be temporarily or permanently muted so that only the one language is heard. Thus, the invention allows a number of different modes of operation which can be selected by the listener so as to learn a new language. Of course, the television and/or radio receiver can also be used for conventional stereo broadcast.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

The FIGURE comprises a block schematic diagram of the sound delay system of the invention.

DESCRIPTION OF THE PREFERRED EMBODIMENTS

The FIGURE illustrates a TV receiver 51 which receives a signal from an antenna 50 and includes a detector 52 for separating the audio multiplex signal and supplying it to an input terminal 1. The input terminal 1 is connected to a buffer amplifier 2 which amplifies the signal and supplies to a deemphasis network 3 which provides an output to a low pass filter 4 which passes signals having a frequency less than 15 kHz. The main channel output signal appears at the output of the low pass filter 4 and it is supplied to the movable tap 5a of a switch 5 contained in a switching circuit A. The multiplex sound signal from the amplifier 2 is also supplied to a band pass filter 6 which has a pass band of 31.5 plus or minus 15.5 kHz. An amplifier 7 receives the output of the filter 6 and passes it to a limiter 8 and the output of the limiter 8 is supplied to an FM detector 9 which demodulates the audio signal on the second channel and passes it to a de-emphasis network 10 that provides an output to a low pass filter 11 having a pass band under 15 kHz. The output of the low pass filter 11 is connected to movable contact 12a of switch 12 and switching circuit A.

The output of the buffer amplifier 2 is also supplied to a band pass filter 13 which in a particular embodiment has a pass band of 55.125 kHz which comprises a switching signal which is removed from the multiplex sound signal.

The output of the band pass filter 13 is supplied to a pair of reed filter 14 and 15 which detect and remove a pair of stereo switching signals. The reed filter 14 detects a switching signal having a frequency of 982.5 kHz which comprises a stereo switching signal. The reed switch 15 has a pass band of 922.5 kHz which comprises a bilingual switching signal.

An AM detector 16 is connected to the output of reed filter 14 and supplies an input to a control 18. The output of reed filter 15 is supplied to an AM detector 17 which supplies an output to a control 19.

The incoming multiplex sound signal will include either the stereo switching signal or the bilingual switching signal and, thus, when the bilingual switching signal is obtained at the output of the AM detector 17, the control 19 will position the four movable taps 5a, 12a, 20a and 21a of four switches 5, 12, 20 and 21 in the switching circuit A so that they engage four fixed taps 5M, 12M, 20M and 21M, respectively. Under these conditions the main signal obtained from the filter 4 will pass through contact 5a to contact 5M then to contact 20M and through contact 20a. The second or sub-signal obtained from filter 11 will pass from contact 12a to fixed contact 12M to contact 21M and to movable contact 21a at this time.

Alternatively, if the stereo switching signal is being transmitted, the AM detector 16 will detect it and supply an output to the control 18 which will move the taps 5a, 12a, 20a and 21a of the switches 5, 12, 20 and 21 so that the movable contacts respectively engage fixed taps 5s, 12s, 20s and 21s. During this condition, the L+R signals which is derived from the filter 4 and the L−R signal which is derived from the filter 11 are supplied to the matrix 22. The matrix 22 derives the left signal L and the right signal R which are respectively applied to movable taps 20a and 21a through the contacts 21s and 20s.

In the invention, the movable taps 20a and 21a are respectively connected with movable taps 23a and 24a. The contacts 23a and 24a are also respectively connected to fixed contacts 25N and 26N of switches 25 and 26, respectively. A pair of fixed taps 23D and 24D are connected together and are connected to the input of a fixed delay means 27.

Movable contacts 23a and 24a of the switches 23 and 24 are connected by a suitable linkage so that they move together such that when the movable tap 23a is engaged with fixed tap 23N the movable tap 24a engages fixed tap 24D and when the movable tap 23a is connected to fixed tap 23D the movable tap 24a engages the fixed tap 24N.

The junction point of the fixed taps 23D and 24D is connected with one fixed tap 28D of the switch 28 through a variable delay device 27 which, for example, can be a semiconductor device such as charge couple device (CCD) or a bucket brigade device (BBD).

When the apparatus of the invention is used, for example, for studying English to Japanese, the delay time of the variable delay device 27 may be set for a time delay of one or two seconds. The junction of the fixed taps 23D and 24D is also connected with one fixed tap 28N of switch 28 and the movable contact 28a is connected to the fixed taps 25D and 26D of switches 25 and 26.

Movable contacts 25a and 26a of the switches 25 and 26 are connected so that they move together such that when the movable tap 25a is connected with fixed tap 25N, the movable tap 26a is connected to the other fixed tap 26D. Also, when the movable tap 25a is connected to contact 25D, the movable tap 26a is connected with the fixed tap 26N.

An amplifier 29 is connected to switch contact 25a and the output of the amplifier 29 is applied to a suitable speaker 31. The movable contact 26a is connected to an amplifier 30 which supplies its output to speaker 32.

Indicating means are also provided for indicating if the signal passing through the variable delay device 27 is the main channel signal, for example, the signal which carries the Japanese or whether it is the sub-channel signal, for example, a signal which carries the English. The negative terminal of battery 33 is connected to ground and the plus terminal is connected through a resistor to a movable contact of switch 34 which is connected to the movable contact 35a of switch 35. The switch 35 has a movable contact 35a which is movable between contacts 35S and 35M. A luminous diode M is connected between contact 35M and ground and a luminous diode S is connected between contact 35S and ground. The movable contact 35a is connected so that it moves together with the movable contact 25a of switch 25 so that when the movable contact 25a is connected to fixed contact 25N, the movable contact 35a is connected to the fixed contact 35S. Also, when the movable contact 25a engages the fixed contact 25D, the movable contact 35a engages the fixed contact 35M.

In use, assume that a foreign movie is being broadcast with multiplex sound signal in which words in the Japanese language are carried on the main channel signal and words in the English language are carried on the sub-channel signal. The main channel signal will be obtained from the movable contact 23a of switch 23 and the sub-channel signal will be present at the movable contact 24a of the switch 24. If the viewer desires to delay the English language words relative to the Japanese language words, the movable contacts 23a, 24a, 25a and 26a of switches 23, 24, 25 and 26 are, respectively, connected with the fixed switch contacts 23D, 24N, 25D and 26N and the movable contact 28a is moved to engage the fixed contact 28D.

In this case, the main channel signal comprising the Japanese language words, will be supplied to the amplifier 29 through the variable delay device 27 so that the Japanese language words which are reproduced by the speaker 31 will occur after the English language words have been reproduced from the speaker 32. In this manner, the user will first hear the English words clearly and then the Japanese language word will be repeated at a later time due to the delay 27. The luminous diode M will be illuminated to indicate that the main channel signal is delayed because the movable contact 35a of the switch 35 will be engaged with the fixed contact 35M.

On the other hand, if the user desires to delay the subchannel signal consisting of the English language words, he will move the contacts 23a, 24a, 25a and 26a of the switches 23, 24, 25 and 26 so that they engage the fixed contacts 23N, 24D, 25N and 26D respectively. Also, the movable contact 28a of switch 28 will be moved to engage the fixed contact 28D. Under these conditions, the sub-channel signal comprising the English language words will be supplied to the amplifier 30 through the variable delay device 27 which will then be applied through switch contact 28a and switch contact 26D and switch 26a to amplifier 30 and be reproduced by speaker 32. The Japanese words will pass from contact 23a to contact 25N then through switch 25a to amplifier 29 and to speaker 31 so the Japanese words will be first reproduced after which the English words will be reproduced due to the delay 27. This allows the user to clearly understand the words in both Japanese and English languages which facilitates his learning the language being studied. The luminous diode S will be illuminated at this time so as to indicate that the sub-channel signal is being delayed because the movable contact 35a of the switch 35 will engage the fixed contact 35S to complete the circuit to the diode M.

The amplifiers 30 and 29 may include volume controls so that either of the signals can be increased in amplitude if desired.

If the user wishes to listen to only the main channel signal carried by the main channel the movable contacts 23a, 24a, 25a and 26a of the switches 23, 24, 25 and 26 can be moved to engage the fixed contacts 23D, 24N, 25N and 26D, respectively, and the movable contact 28a of the switch 28 may be moved to engage the fixed contact 28N. If the user wishes to listen to only the sub-voice channel carried by the sub-channel signal the movable contacts 23a, 24a, 25a and 26a of switches 23 through 26 can be moved to respectively engage the fixed contacts 23N, 24D, 25D and 26N. At the same time, the movable contact 28a of switch 28 is moved to engage the fixed contact 28N.

If a stereo signal is to be reproduced by the mechanism of the invention rather than the language signal when the stereo signal arrives at the input terminal 1, the movable contact 28a of the switch 28 will engage the fixed contact 28N and, if desired, a reverberant effect is available and can be utilized by supplying one of the stereo signals to the variable delay device 27 and suitably adjusting the delay time of the delay device 27 to provide the reverberation effect. For this purpose, the movable contact 28a of the switch 28 can be moved so that it engages the fixed contact 28D of the bilingual switching signal.

The luminous diodes can be eliminated by providing an indication on the cathode ray tube with a suitable beam control means, if desired.

The switches 23, 24, 25 and 26 can be remote controlled if desired.

A suitable time delay varying knob can be connected to the time delay means 27 and if BBD or CCD devices are used as the variable delay device 27, the delay time can be easily controlled by changing the time of occurrence of the control clock pulses. Furthermore, an endless tape recorder or a voice delay apparatus such as a long air hose can be used as the variable delay device 27 and the delay may be from very short time such as milliseconds up to two seconds when used as a translating device.

The frequency spectrum of the multiplex sound signal used in Japan is as follows.

1. The Main Channel Signal

The frequency deviation of the main channel signal is ±25 kHz with the audio signal frequency range being 15 kHz so that ordinal TV receivers can receive the audio signal as usual when the multiplex sound signal is broadcasted.

2. The Sub-channel Signal

The sub-channel signal is a FM wave having the subcarrier whose frequency is twice as high as the horizontal synchronizing frequency fH (=15.75 kHz), in order to avoid the buzz interruption which occurs in inter-carrier receiving system TV receivers. The frequency deviation is ±15 kHz when a bilingual signal is broadcasted, or is ±20 kHz when a stereo signal is broadcasted.

3. The Controlling Channel Signal

The controlling channel signal is an AM wave having the sub-carrier whose frequency is 3.5 times as high as the horizontal synchronizing frequency +H. The sub-carrier is amplitude-modulated by a sine wave of 922.5 kHz when bilingual or by a sine wave of 982.5 kHz when stereo.

4. The Component of the Main and Sub-channel Signal

The sum of left and right signal forms the main channel signal and the difference between left and right signal forms the sub-channel signal.

On the other hand, when a bilingual signal is broadcasted, the main channel signal carries one language while the sub-channel signal carries the other language corresponding to said one language.

The signal of 1, 2 and 3 are added and frequency-modulate the audio signal carrier whose frequency is 4.5 MHz higher than that of the video signal carrier.

It is seen that the invention provides a new and novel audio reproducing means which has particular application for use in learning languages, although it has been described with respect to preferred embodiments, it is not to be so limited as changes and modifications may be made therein which are within the full intended scope as defined by the appended claims.

We claim as our invention:

1. A signal delaying apparatus for delaying one of two audio signals reproduced by a multiplex sound demodulating apparatus particularly one of said two audio signals being of one language, another audio signal being of another language corresponding to said one language, comprising a pair of input terminals to which said two audio signals are supplied respectively, means for delaying said one of two audio signals, a pair of output terminals to be connected to a pair of speakers, respectively, and at which said one of two audio signals and another audio signal is obtained.

2. An audio demodulating and delaying system for a pair of FM stereo signals or a pair of audio signals of different languages comprising, means for demodulating said pair of stereo and language signals, control means for detecting whether stereo or language signals are being received, a stereo matrix, first switching means connected to said control means and to said matrix receiving said pair of audio signals, and a delay means to which said pair of audio signals are applied for delaying one of said pair of audio signals relative to the other, including indicating means for indicating which of said audio signals is delayed relative to the other.

3. A system according to claim 2 wherein said first switching means includes four switches with the movable contact of the first switch receiving a first audio signal and which is movable to supply an input to said matrix or to a first fixed contact of a second switch which has a movable contact that supplies one of the output audio signals of said first switching means and has a second fixed contact connected to a first output of said matrix, the movable contact of the third switch receiving a second audio signal and which is movable to supply an input to said matrix or to a fixed contact of a fourth switch which has a movable contact that supplies the other output of said first stereo and language signals and if stereo signals are present passing them through said matrix and if language signals are present bypassing said matrix, second switching means connected to said delay means and receiving the pair of audio signals from said first switching means and selectively passing either or neither of them through said delay means, and a pair of speakers connected to said second switching means to reproduce said pair of switching means and has a second fixed contact connected to a second output of said matrix.

4. A system according to claim 3, wherein said second switching means has fifth, sixth, seventh, eighth and ninth switches with the movable contact of said fifth switch connected to the movable contact of said third switch and having a fixed contact connected to the input of said delay means, the movable contact of said sixth switch connected to one of said speakers and having a first fixed contact connected to the movable contact of said fifth switch and a second fixed contact connected to the movable contact of said ninth switch, the movable contact of said seventh switch connected to the movable contact of said fourth switch and having a fixed contact connected to the input of said delay means, the movable contact of said eighth switch connected to the other of said speakers and having a first fixed contact connected to the movable contact of said seventh contact and a second fixed contact connected to the movable contact of said ninth switch, and the movable contact of the ninth switch movable to selectively receive the output or the input of said delay means.

5. A system according to claim 4 wherein the movable contacts of the fifth and seventh switches are ganged to move together and the movable contacts of the sixth and eighth switches are ganged to move together.

6. A system according to claim 5 wherein said indicating means includes a tenth switch, a pair of diodes with one side connected to ground and the other sides connected to first and second fixed contacts of said tenth switch, the movable contact of said tenth switch ganged to move with said movable contacts of said sixth and eighth switches, an eleventh switch, a voltage supply connected between ground and the movable contact of said eleventh switch, and the movable contact of said eleventh switch ganged to move with the movable contact of said ninth switch.

7. An audio demodulating and delaying system for a pair of stereo signals or a pair of audio signals of different languages comprising, means for demodulating a pair of audio signals control means for detecting whether stereo or language signals are being received, a stereo matrix receiving said pair of audio signals and generating said pair of stereo signals, first switching means having first pair of input terminals connected to said means for demodulating said pair of audio signals, second pair of input terminals supplied with said pair of stereo signals, and a pair of output terminals selectively connected to said first or second pair of input terminals by said control means, and delay means connected to one of said pair of output terminals for delaying one of audio signals obtained at said pair of output terminals of said first switching means relative to the other.

* * * * *